United States Patent [19]
Phillips et al.

[11] Patent Number: 6,038,652
[45] Date of Patent: Mar. 14, 2000

[54] EXCEPTION REPORTING ON FUNCTION GENERATION IN AN SIMD PROCESSOR

[75] Inventors: John William Phillips, Menlo Park; Rahul Saxena, Sunnyvale, both of Calif.

[73] Assignee: Intel Corporation, Santa Clara, Calif.

[21] Appl. No.: 09/165,005

[22] Filed: Sep. 30, 1998

[51] Int. Cl.[7] .............................. G06F 9/302; G06F 9/40

[52] U.S. Cl. .......................... 712/22; 712/221; 708/232; 708/534

[58] Field of Search .............................. 712/16, 235, 219, 712/3, 20, 5, 6, 9, 236, 200, 245, 222, 14, 22, 221; 345/431, 441, 505; 710/127; 705/514; 708/232, 498, 534, 552

[56] References Cited

U.S. PATENT DOCUMENTS

| 5,392,385 | 2/1995 | Evangelisti et al. | 345/431 |
| 5,533,034 | 7/1996 | Kuwata et al. | 371/32 |
| 5,765,037 | 6/1998 | Morrison et al. | 712/245 |

*Primary Examiner*—Daniel H. Pan
*Attorney, Agent, or Firm*—Blakely, Sokoloff, Taylor & Zafman LLP

[57] ABSTRACT

The present invention is a method and apparatus for reporting exception in a single instruction multiple data (SIMD) processor in computing an arithmetic function for a plurality of argument data. The SIMD processor is configured for processing N elements simultaneously. A sequence of instructions is re-arranged to allocate the plurality of argument data in the N elements. The N elements are processed simultaneously. The exceptions for N elements are detected simultaneously. The detected exceptions are then combined to generate a global exception.

21 Claims, 4 Drawing Sheets

EXCEPTION REPORTING ON FUNCTION GENERATION IN AN SIMD PROCESSOR

BACKGROUND

1. Field of the Invention

This invention relates to microprocessor systems. In particular, the invention relates to exception reporting.

2. Description of Related Art

Computing complex functions such as divide and square-root for floating-point arithmetic may be performed by hardware or software. Techniques to generate these functions usually involve iterative algorithms such as the Newton method. Implementing these functions by hardware requires specialized circuits to carry out the iterative steps and typically involves a large amount of silicon area. Therefore, it is more desirable to implement these functions by software methods. Software methods are based on the execution of a routine using primitives available in hardware such as multiplier and multiplier-accumulator.

One problem with computing complex functions using iterative algorithms is the occurrence of exceptions. An exception is an error condition caused by the computation of the functional argument during the iterative process. Examples of such an error condition include divide-by-zero and floating-point overflow/underflow. When there is an exception, it is necessary to report the exception in an efficient manner so that appropriate action can be taken.

A single instruction multiple data (SIMD) architecture operates on multiple data in parallel. A typical SIMD machine has N data storage elements that can be processed simultaneously. By processing N data storage elements in parallel, the computational throughput is improved N times over a single data machine. The speed advantage is even more significant when a number of complex functions can be generated in parallel utilizing the SIMD architecture.

When computing complex functions, an SIMD processor may generate exceptions during the iterative process. For N data elements, there may be N times the number of exceptions that may occur in the iterative processes. The overhead incurred to process these exceptions may be expensive and degrade performance.

Therefore there is a need to provide an efficient technique to report exceptions occurring in computing complex functions on an SIMD machine.

SUMMARY

The present invention is a method and apparatus for reporting exception in a single instruction multiple data (SIMD) processor in computing an arithmetic function for a plurality of argument data. The SIMD processor is configured for processing N elements simultaneously. A sequence of instructions is re-arranged to allocate the plurality of argument data in the N elements. The N elements are processed simultaneously. The exceptions for N elements are detected simultaneously. The detected exceptions are then combined to generate a global exception.

BRIEF DESCRIPTION OF THE DRAWINGS

The features and advantages of the present invention will become apparent from the following detailed description of the present invention in which.

DESCRIPTION

The present invention is a method and apparatus for reporting exception during computing complex functions in an SIMD processor. The technique schedules or re-arranges the instructions to carry out the iterative process such that the two places that may potentially cause exception are performed at the same time. A combine element combines the detected exception flags of the N result elements in the SIMD elements. The exception reporting logic simplifies the process by reducing the number of places that exceptions may occur from 2N to 2.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
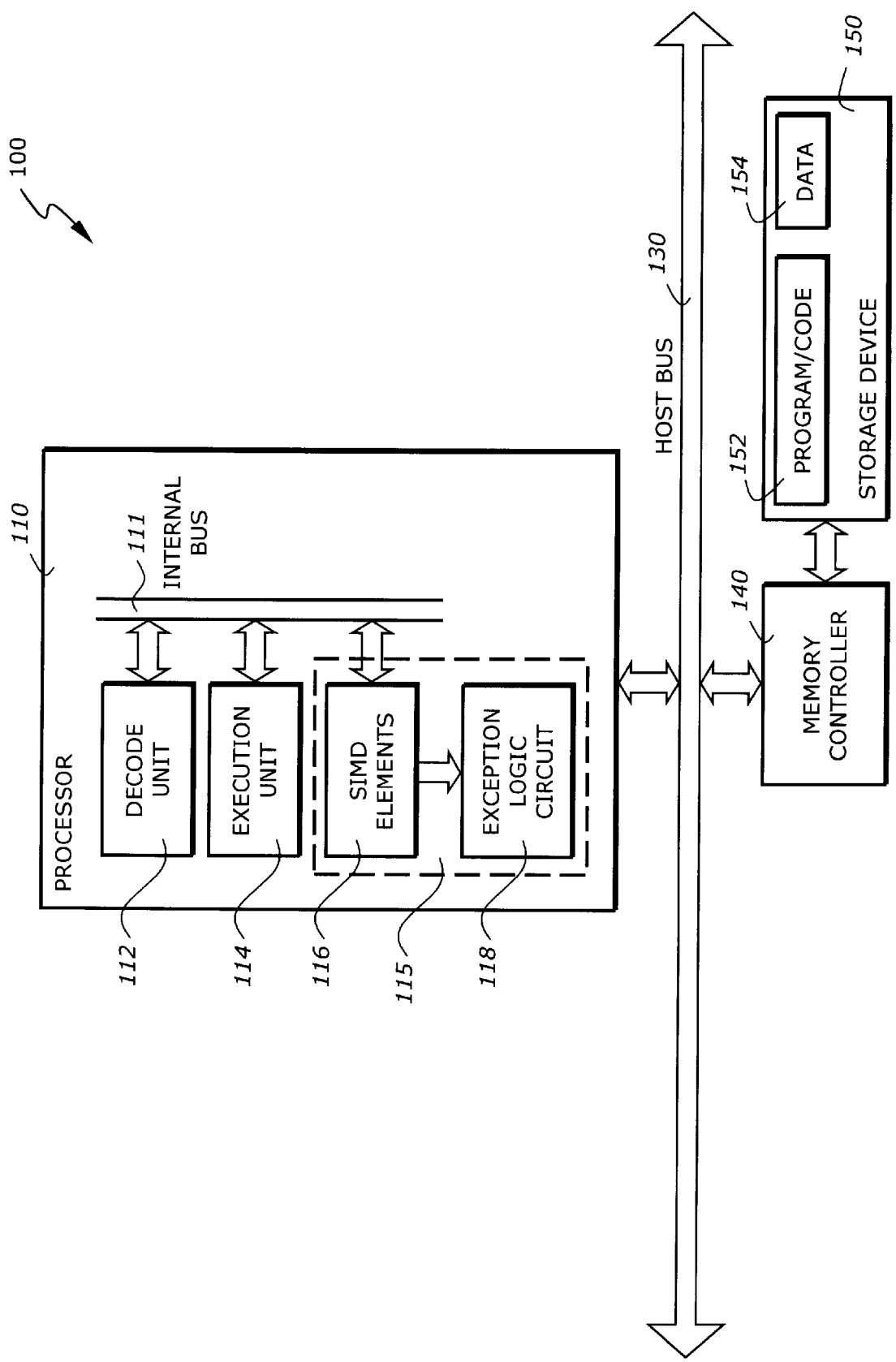
FIG. 1 is a diagram illustrating one embodiment of a system in accordance with the teachings of the present invention.

FIG. 1 is a diagram illustrating one embodiment of a computer system 100 in which one embodiment of the present invention may be utilized. The computer system 100 comprises a processor 110, a host bus 130, a memory controller 140, and a storage device 150.

The processor 110 represents a central processing unit of any type of architecture, such as complex instruction set computers (CISC), reduced instruction set computers (RISC), very long instruction word (VLIW), or hybrid architecture. While this embodiment is described in relation to a single processor computer system, the invention could be implemented in a multi-processor computer system.

The memory controller 140 provides various access functions to the storage device 150. The memory controller 140 is coupled to the host bus 130 to allow the processor to access the storage device 150. The storage device 150 represents one or more mechanisms for storing information. For example, the storage device 150 may include non-volatile or volatile memories. Examples of these memories include flash memory, read only memory (ROM), or random access memory (RAM).

FIG. 1 also illustrates that the storage device 150 has stored therein program code 152 and data 154. The program code 152 represents the necessary code for performing any and/or all of the techniques in the present invention. The data 154 stores data used by the program code 152, graphics data and temporary data. Of course, the storage device 150 preferably contains additional software (not shown), which is not necessary to understanding the invention.

FIG. 1 additionally illustrates that the processor 110 includes a decode unit 112, an execution unit 114, an SIMD exception reporting circuit 115, and an internal bus 111. Of course, the processor 110 contains additional circuitry, which is not necessary to understanding the invention. The decode unit 112 is used for decoding instructions received by processor 110 into control signals and/or microcode entry points. In response to these control signals and/or microcode entry points, the execution unit 114 performs the appropriate operations. The execution unit 114 is any arithmetic or logic unit that executes the instruction as decoded by the decode unit 112. In one embodiment, the execution unit 114 is a floating-point unit that operates on multiple data simultaneously The SIMD exception reporting circuit 115 includes a set of SIMD elements 116 and an exception logic circuit 118. The SIMD elements 116 represent a storage area on processor 110 for storing information, including control/status information, numeric data. In one embodiment, the SIMD elements 116 store N data items to be processed by a floating-point unit. The exception logic circuit 118 includes circuitry to detect individual exceptions and report the combined exceptions.

Figure 2:
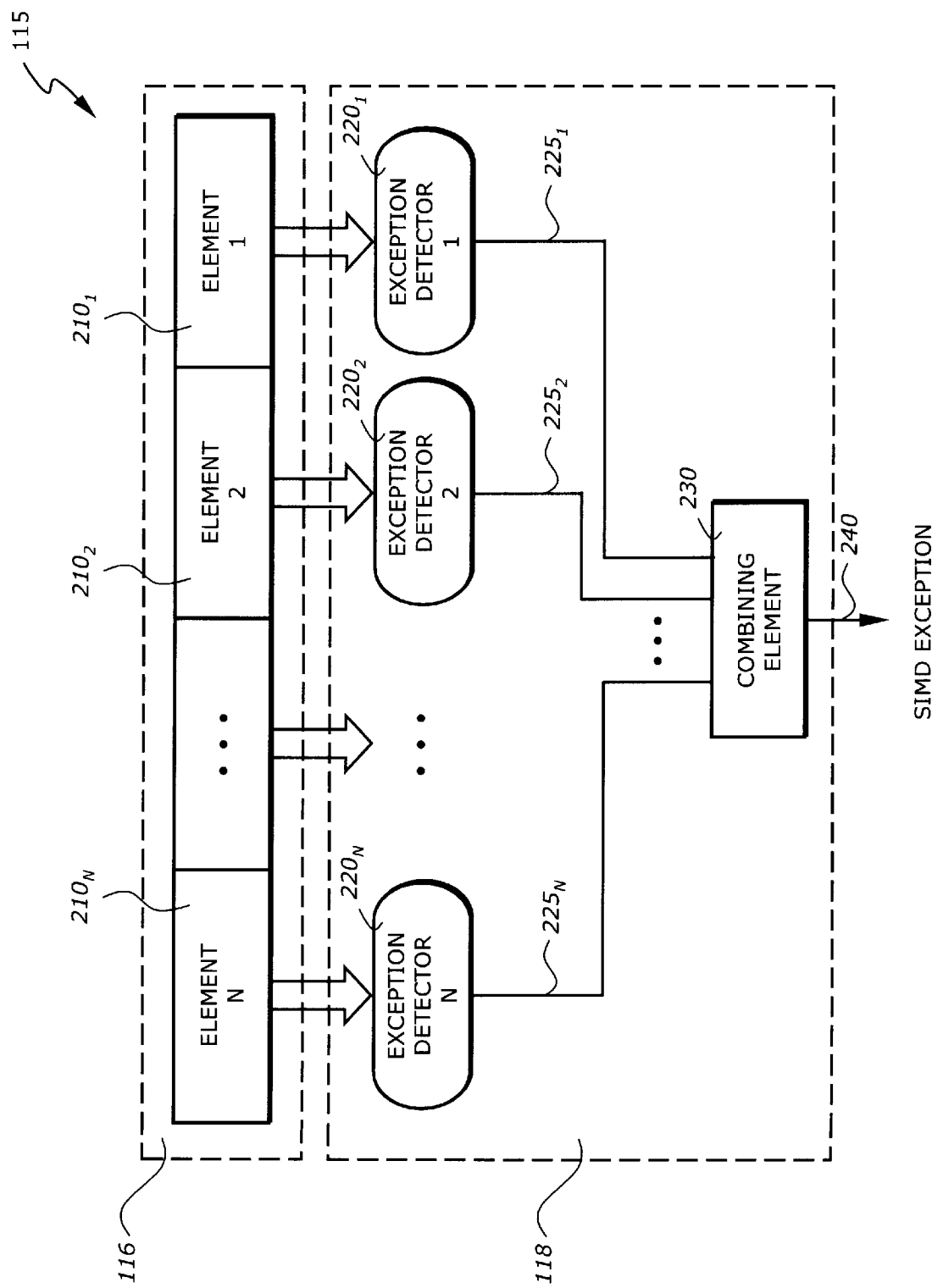
FIG. 2 is a diagram illustrating SIMD storage elements and exception logic circuit according to one embodiment of the invention.

FIG. 2 is a diagram illustrating an SIMD exception reporting circuit 115 according to one embodiment of the invention. The SIMD exception reporting circuit 115 includes a set of SIMD elements 116 and the exception logic circuit 118.

The set of SIMD elements 116 includes N result elements $210_1$ to $210_N$ which store the final or intermediate results in the iterative process of computing the complex functions. In one embodiment, the set of SIMD elements 116 include a set of 128-bit registers, each register stores four 32-bit floating-point data items. The computations of the complex functions are performed on these four 32-bit floating-point data items simultaneously. The arithmetic operations performed on these data items are independent of one another.

The exception logic circuit 118 includes a set of N exception detectors $220_1$ to $220_N$ and a combining element 230. The N exception detectors $220_1$ to $220_N$ correspond to the N result elements $210_1$ to $210_N$, respectively. The N exception detectors $220_1$ to $220_N$ generate exception flags or indicators $225_1$ to $225_N$, respectively, to indicate that there is an exception occurring at the corresponding element as a result of an abnormal behavior in the computational steps during the iterative process. In one embodiment, each of the exception flags or indicators $225_1$ to $225_N$ is a signal having an active HIGH level. When the exception flag or indicator is a logic HIGH (e.g., logic 1), an exception has occurred in the corresponding result element.

The combining element 230 is a logic circuit to combine the exception flags or indicators generated from the N exception detectors $220_1$ to $220_N$ and generate an SIMD exception flag/indicator 240. The SIMD exception flag/indicator 240 indicates that there is at least one exception occurring in the result elements $210_1$ to $210_N$. For SIMD processing, one exception in one SIMD data item is sufficient to generate an exception for the entire SIMD processor. The SIMD exception flag/indicator 240 may be implemented as a signal with a predefined active logic level (e.g., HIGH, LOW), or a bit stored in a storage element as part of a status reporting logic circuit. The SIMD exception is a global exception for the entire SIMD processor. The combining element 230 may be implemented as a logic gate according to the active level of the individual exception signals $225_1$ to $225_N$. If the individual detected exception signals $225_1$ to $225_N$ are represented by active HIGH or LOW signal, then the combining element 230 can be implemented as an OR or AND gate, respectively.

The technique in the present invention can be used in the implementation of any complex functions, or any processing steps that may cause exceptions. For illustrative purposes, two complex functions are used: the divide and square-root functions. There are a number of iterative algorithms to compute the divide and square-root functions. One of the most popular method is the Newton algorithm. The technique is described in the following.

The computation of a/b can be carried out as follows:

Step 1: Scale b to lie in the range $1 \leq b < 2$ and get an approximate value of 1/b (call it $X_0$) using a table lockup.

Step 2: Iterate $X_{i+1} = X_i(2-X_i b)$ until reaching an $X_n$ that is accurate enough.

Step 3: Compute $a*X_n$ and reverse the scaling done in step 1.

The computation of $\sqrt{a}$ without using division can be carried out as follows:

Step 1: Scale a in appropriate range and get an approximate value as the initial value: $Y_0 = 1/\sqrt{a}$ Step 2: Iterate $Y_{i+1} = (Y_i/2)(3 - a*Y_i^2)$ until reaching an $Y_k$ that is accurate enough.

As is known by one skilled in the art, variations to the above steps are possible. In general, the iterative algorithm to compute a complex function includes the following steps:

Step 1: Initialize (e.g., select initial estimate, scale to appropriate range).

Step 2: Perform iterative operations, usually involving add-and-multiply operations.

Step 3: Finalize.

In the above iterative processes. There are two places that can cause exception. The first place is at step 1 where the initial value is obtained. At this step a reciprocal operation is performed which may cause an exception. An example of such an exception is a divide-by-zero result. Other exceptions are also possible. The second place is the last step of the iterative process. An example of such an exception is an overflow caused by the multiply-and-accumulate operation. Other exceptions may also occur at this place. To report the exception, it is therefore necessary to check the exception at these two places.

Figure 3:
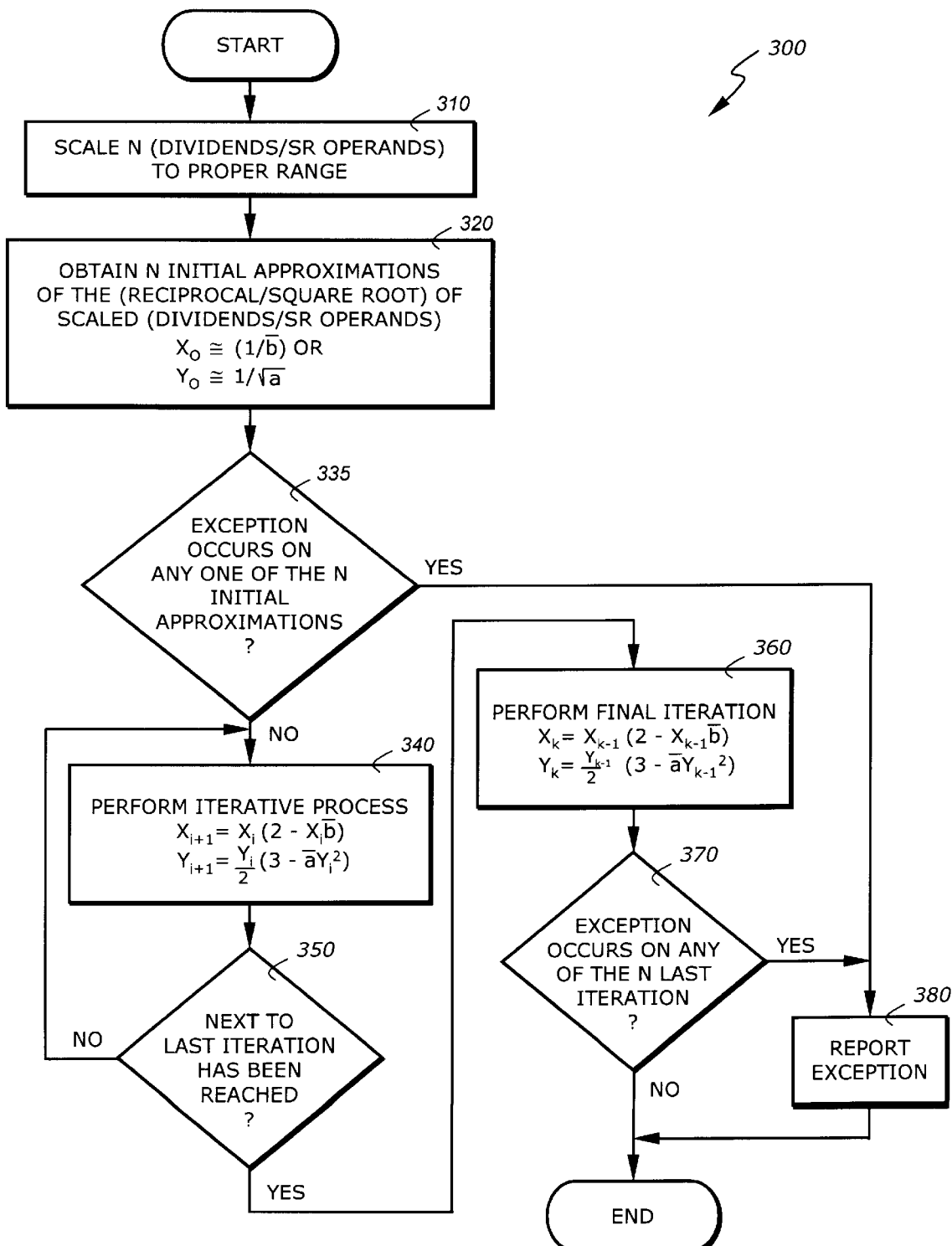
FIG. 3 is a flowchart illustrating a process to report exception during computing complex functions according to one embodiment of the invention.

FIG. 3 is a flowchart illustrating a process 300 to report exception during computing complex functions according to one embodiment of the invention.

Upon START, the process 300 prepares the argument data to be within proper range (Block 310). This can be performed by scaling the data items by appropriate scale factors. The argument data may be either the dividends or the square root (SR) operands. Each of the N data items may have a different scale factor depending on the value of the argument data. Then the process 300 obtains N initial approximations of the scaled data items to start the iterative process (Block 320). The initial approximated values for the divide and the square root functions are $X_0 = (1/b)$ and $Y_0 = 1/\sqrt{a}$, respectively. The approximated values can be obtained by a number of ways. One simple way is using table look-up.

The process 300 then determines if there is any exception occurring in obtaining the initial values for the iterative process (Block 335). If there is any exception caused by any of the data items, the process 300 reports the exception (Block 380) and is terminated. If there is no exception at this initialization step, the process 300 performs the iterative process by computing the next value of the function (Block 340). The next value is determined according to the iterative algorithm as follows:

For divide function: $X_{i+1} = X_i(2 - X_i * b)$

For square-root function: $Y_{i+1} = (Y_i/2)(3 - a*Y_i^2)$

The process 300 then determines if the iteration reaches the next-to-last iteration (Block 350). If not, the process 300 returns to Block 340 to continue the iterative process. If the next-to-last iteration has been reached, the process 300 proceeds to perform the final iteration k (Block 360). Then the process 300 determines if there is any exception occurring in this final iteration (Block 370). If there is any exception, the process 300 reports the exception (Block 380) and is terminated. If there is no exception, the computation of the function is completed and the process 300 is terminated.

Figure 4:
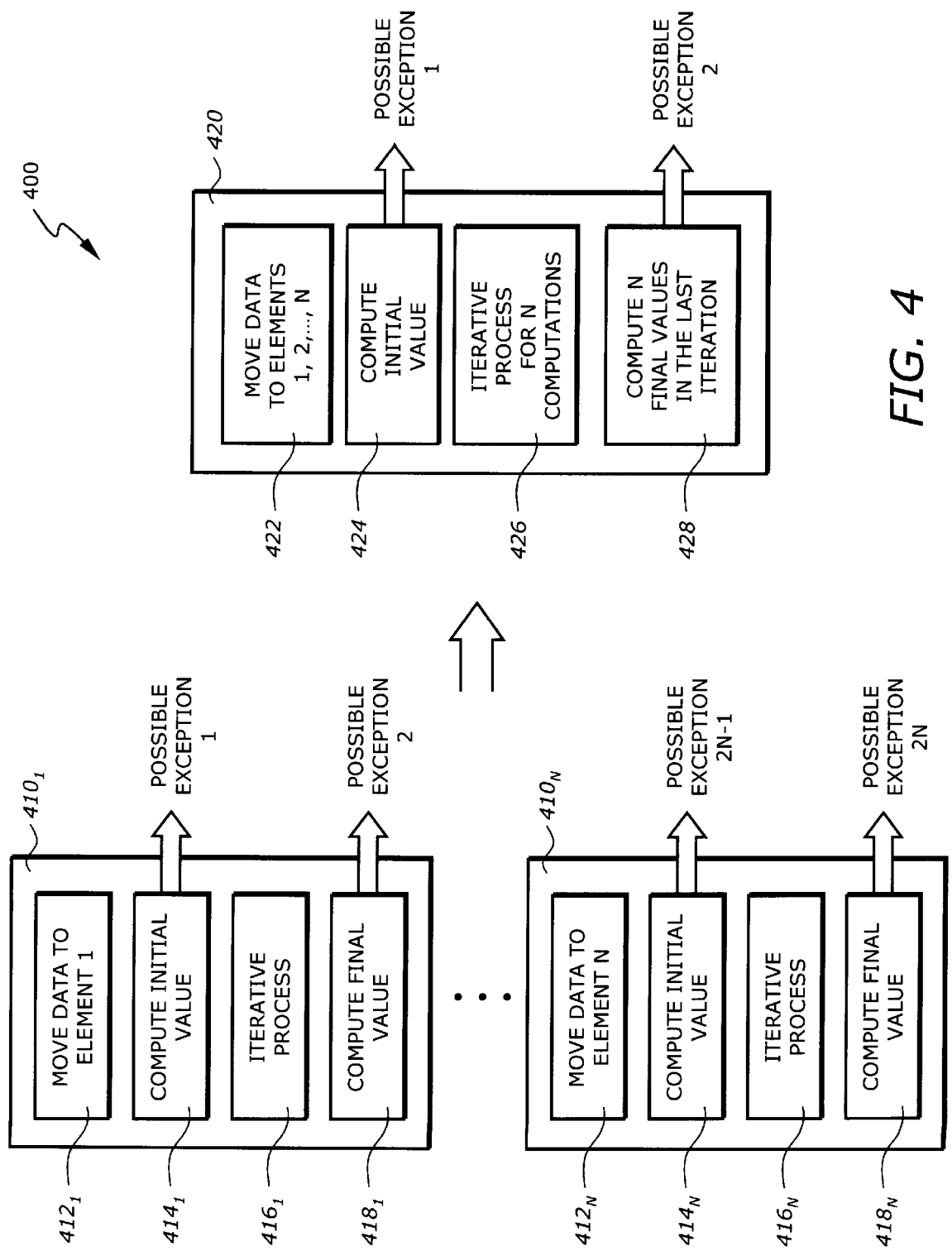
FIG. 4 is a diagram illustrating a re-arrangement of instructions in the computation of complex functions according to one embodiment of the invention.

FIG. 4 is a diagram illustrating a re-arrangement 400 of instructions in the computation of complex functions according to one embodiment of the invention. The re-arrangement 400 includes N sequential blocks $410_1$ to $410_N$ and a parallel block 420.

Each of the sequential blocks $410_1$ to $410_N$ represents a code sequence that operates on a single data item. The sequential blocks $410_1$ to $410_N$ have four main sub-blocks $412_1$ to $412_N$, $414_1$ to $414_N$, $416_1$ to $416_N$, and $418_1$ to $418_N$. The sub-block $412_1$ to $412_N$ move the argument data to the elements 1 to N in preparation for the computation of the complex functions. The sub-blocks $414_1$ to $414_N$ compute the initial approximated values. These sub-blocks potentially may cause exception due to a divide-by-zero or other causes. The sub-blocks $416_1$ to $416_N$ perform the iterative process in the computation of the complex functions. The sub-blocks $418_1$ to $418_N$ compute the final values in the last iterations. These sub-blocks $418_1$ to $418_N$ may cause exception due to overflows or underflows or other causes. For N sub-blocks, the total number of possible exceptions is 2N. As is known by one skilled in the art, if less or more than N sub-blocks are used, the total number of places where exceptions may occur is proportionally reduced or increased, respectively.

The parallel block 420 shows the re-arrangement of the instructions such that all operations are done in parallel by loading information and process the loaded information on N SIMD elements at the same time. The sub-block 422 moves all the argument data to N result elements in the SIMD registers. The sub-block 424 computes N initial approximated values. The sub-block 424 may cause an exception due to a possible error caused by the divide-by-zero or other errors in any of the SIMD elements. The sub-block 426 performs the iterative process for all N elements simultaneously. The sub-block 428 computes N final values in the last iteration. The sub-block 428 may cause exception due to overflow/underflow or other causes in any of the SIMD elements. There are a total of only two possible exceptions in the parallel block 420.

The present invention provides a fast and efficient technique to report exception caused by iterative algorithms in computing complex functions. The technique re-arranges the computational steps to align the two places that can cause exception of all the SIMD elements at the same time. The exception reporting logic circuit includes individual exception detection circuits corresponding to the N SIMD elements and a combiner to combine the result of the individual detections. The technique reduces the number of places that can cause exceptions from 2N to 2.

The technique of the present invention can be used in a number of applications. Examples of these applications include three-dimensional (3-D) graphics, signal processing, image processing, animation, matrix algebra, and numerical methods.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for exception reporting in a single instruction multiple data (SIMD) processor, the method comprising:

re-arranging a sequence of instructions to allocate a plurality of argument data in N elements for parallel processing by an execution unit, the sequence of instructions computing an arithmetic function for the plurality of argument data;

processing the N elements simultaneously;

detecting exceptions for the N elements simultaneously; and combining the detected exceptions to generate a global exception.

2. The method of claim 1 wherein the arithmetic function is one of a divide and square-root functions.

3. The method of claim 2 wherein processing the N elements comprises iteratively computing the arithmetic function.

4. The method of claim 1 wherein the exceptions include a reciprocal exception and a multiply-and-add exception.

5. The method of claim 4 wherein the detected exceptions assert a predetermined logic level.

6. The method of claim 5 wherein the predetermined logic level is one of high and low levels.

7. The method of claim 6 wherein the combining includes an OR and an AND operations corresponding to the high and low levels, respectively.

8. An apparatus to report exception in a single instruction multiple data (SIMD) processor, the apparatus comprising:

N storage elements coupled to an execution unit for storing N data items corresponding to a plurality of argument data used by an arithmetic function for parallel processing by the execution unit, the plurality of argument data being allocated by a sequence of instructions computing the arithmetic function;

N exception detectors coupled to the N storage elements for detecting exceptions for the N data items simultaneously; and a combining element coupled to the N exception detectors for combining the detected exceptions to generate a global exception.

9. The apparatus of claim 8 wherein the arithmetic function is one of a divide and square-root functions.

10. The apparatus of claim 9 wherein the execution unit processes the N data items iteratively in computing the arithmetic function.

11. The apparatus of claim 8 wherein the exceptions include a reciprocal exception and a multiply-and-add exception.

12. The apparatus of claim 11 wherein the detected exceptions assert a predetermined logic level.

13. The apparatus of claim 12 wherein the predetermined logic level is one of high and low levels.

14. The apparatus of claim 13 wherein the combining element is one of OR and AND gates corresponding to the high and low levels, respectively.

15. A processor comprising:

an execution unit configured for processing N data items simultaneously; and an exception reporting logic circuit coupled to the execution unit for reporting exception, the exception reporting logic circuit comprising:

N storage elements coupled to an execution unit for storing N data items corresponding to a plurality of argument data used by an arithmetic function for parallel processing by the execution unit, the plurality of argument data being allocated by a sequence of instructions computing the arithmetic function, N exception detectors coupled to the N storage elements for detecting exceptions for the N data items simultaneously, and a combining element coupled to the N exception detectors for combining the detected exceptions to generate a global exception.

16. The processor of claim 15 wherein the arithmetic function is one of a divide and square-root functions.

17. The processor of claim 16 wherein the execution unit processes the N data items iteratively in computing the arithmetic function.

18. The processor of claim 15 wherein the exceptions include a reciprocal exception and a multiply-and-add exception.

19. The processor of claim 18 wherein the detected exceptions assert a predetermined logic level.

20. The processor of claim 19 wherein the predetermined logic level is one of high and low levels.

21. The processor of claim 20 wherein the combining element is one of OR and AND gates corresponding to the high and low levels, respectively.

* * * * *